(12) United States Patent
Rofrano et al.

(10) Patent No.: US 12,168,338 B2
(45) Date of Patent: Dec. 17, 2024

(54) EXTRUDED POLYSTYRENE BOARDSTOCK AND ROOF STRUCTURE CONTAINING THE EXTRUDED POLYSTYRENE BOARDSTOCK

(71) Applicants: DDP SPECIALTY ELECTRONIC MATERIALS US, LLC, Wilmington, DE (US); DUPONT SAFETY & CONSTRUCTION, INC., Wilmington, DE (US)

(72) Inventors: Joseph Rofrano, Wilmington, DE (US); Valentina Woodcraft, Midland, MI (US); Brian Deshano, Midland, MI (US); Mark Barger, Midland, MI (US)

(73) Assignees: DDP SPECIALTY ELECTRONIC MATERIALS US, LLC, Wilmington, DE (US); DUPONT SAFETY & CONSTRUCTION, INC., Wilmington, DE (US)

(*) Notice: Subject to any disclaimer, the term of this patent is extended or adjusted under 35 U.S.C. 154(b) by 0 days.

(21) Appl. No.: 17/842,213

(22) Filed: Jun. 16, 2022

(65) Prior Publication Data

US 2023/0405979 A1 Dec. 21, 2023

Related U.S. Application Data

(60) Provisional application No. 63/352,687, filed on Jun. 16, 2022, provisional application No. 63/214,303, filed on Jun. 24, 2021.

(51) Int. Cl.
| | | |
|---|---|---|
| *B32B 27/06* | (2006.01) | |
| *B32B 5/18* | (2006.01) | |
| *B32B 7/12* | (2006.01) | |
| *B32B 27/08* | (2006.01) | |
| *B32B 27/20* | (2006.01) | |
| *B32B 27/30* | (2006.01) | |
| *B32B 27/32* | (2006.01) | |

(52) U.S. Cl.
CPC .............. *B32B 27/065* (2013.01); *B32B 5/18* (2013.01); *B32B 27/08* (2013.01); *B32B 27/20* (2013.01);
(Continued)

(58) Field of Classification Search
CPC ......... B32B 27/065; B32B 5/18; B32B 27/08; B32B 27/20; B32B 27/306; B32B 27/32; B32B 7/12
See application file for complete search history.

(56) References Cited

U.S. PATENT DOCUMENTS 3,892,899 A * 7/1975 Klein ..................... E04D 11/02
428/312.4
5,380,767 A 1/1995 Suh et al.
(Continued)

FOREIGN PATENT DOCUMENTS

GB 2587601 A 4/2021
WO 00/69624 A1 11/2000

OTHER PUBLICATIONS

Woodcraft et al., "Thermally insulating extruded foams laminated with barrier films", Journal of Cellular Plastics, 2019, vol. 55(I), 89-103. (Year: 2019).*

(Continued)

*Primary Examiner* — Hai Vo

(57) ABSTRACT

An inverted roof membrane assembly (IRMA) includes decking, a waterproofing membrane above the decking, a layer of polymer foam insulation board above the waterproofing membrane, and ballast above the polymer foam insulation board layer. The polymer foam insulation board includes a polymer foam layer that includes an alkenyl aromatic polymer and an infrared radiation attenuator, and first and second facer layers.

14 Claims, 1 Drawing Sheet

(52) U.S. Cl.
CPC ............ *B32B 27/306* (2013.01); *B32B 27/32* (2013.01); *B32B 7/12* (2013.01); *B32B 2250/40* (2013.01); *B32B 2262/106* (2013.01); *B32B 2266/0228* (2013.01); *B32B 2307/41* (2013.01); *B32B 2307/416* (2013.01); *B32B 2307/5825* (2013.01); *B32B 2307/7244* (2013.01); *B32B 2307/7246* (2013.01); *B32B 2419/06* (2013.01)

(56) References Cited

U.S. PATENT DOCUMENTS

| | | |
|---|---|---|
| 8,268,737 B1 | 9/2012 | Kumar |
| 8,324,287 B2 | 12/2012 | Hood et al. |
| 9,051,438 B2 | 6/2015 | Hood et al. |
| 2008/0139682 A1* | 6/2008 | Vo .......................... C08J 9/0066 521/137 |
| 2008/0140892 A1 | 6/2008 | Fong et al. |
| 2010/0104809 A1 | 4/2010 | Duda et al. |
| 2013/0133295 A1* | 5/2013 | Shah ...................... B32B 27/08 524/427 |
| 2021/0301526 A1* | 9/2021 | Leahy .................. B32B 13/045 |

OTHER PUBLICATIONS

PCT International Search Report for Application No. PCT/US2022/034231; Theo Barenbrug, Authorized Officer; ISA/EPO; Oct. 2, 2022.

* cited by examiner

EXTRUDED POLYSTYRENE BOARDSTOCK AND ROOF STRUCTURE CONTAINING THE EXTRUDED POLYSTYRENE BOARDSTOCK

BACKGROUND OF THE INVENTION

Field of the Invention

The present invention relates to extruded polystyrene boardstock and roof structures, particularly inverted roof membrane assemblies (IRMAs), also known as "protected membrane roofs" (PMRs), which include a layer of extruded polystyrene boardstock.

Description of Related Art

Low slope roofs are often constructed by installing an insulation layer overtop a decking and installing a waterproofing membrane over the insulation layer. Although this type of construction is widely used, it has significant problems because the membrane is exposed to the elements and significant seasonal as well as daily thermal cycling. The membrane is subjected to physical abuse (punctures, falling debris, hail, falling ice, ice buildup, for example), damaging electromagnetic radiation (UV, visible light, infrared, etc.), chemical attack (such as from atmospheric pollutants such as ozone, sulfur dioxide, acid rain, bird droppings), as well as large temperature swings. All of these things can damage the exposed membrane, shortening its useful life and requiring frequent repair.

Many of these problems are resolved with so-called inverted roof membrane assemblies (IRMAs). In an IRMA, the insulation layer is applied above the membrane rather than below it. The membrane is protected from most potential causes of damage and therefore has a much longer useful life and requires fewer repairs and less maintenance. With proper maintenance, an IRMA can last as much as twice or three times as long as a conventional low slope membrane roof. Another advantage of IRMAs is that they are useful as components of so-called "green roof" and "blue roof" systems, in which vegetation and detained water are located at the top of the roof assembly.

Extruded polystyrene (XPS) foam is a good candidate for the insulation layer in an IRMA because of its combination of good mechanical properties, good insulation values, resistance to water penetration and low cost. XPS foam is manufactured as boardstock that is easily installed and fitted to specific roof geometries.

Building codes in many jurisdictions are being modified to require increased roof insulation values. This is achievable in principle by making the insulation layer thicker, as insulation values generally increase together with thickness. There are practical constraints on doing this, however; often the vertical space is needed for other structures, and in roof replacement situations the surrounding structure (parapets, wall heights, etc.) may not allow for much if any increased insulation thickness. Thicker insulation layers also mean higher project costs.

Of course, thinner insulation layers can be used if thermal resistivity, or the RSI-value, is high. XPS in general may have an RSI-value of up to about 1 K·m$^2$/W per 25.4 mm of thickness. Thinner layers of XPS insulation could be used if the RSI value were higher. One way of achieving this is to incorporate an infrared attenuator such as graphite or carbon black into the XPS foam. However, some XPS insulation that contains infrared attenuators has been found to be prone to warping when exposed to sunlight during installation.

BRIEF SUMMARY OF THE INVENTION

This invention is in one aspect a polymer foam insulation board comprising a foamed polymer layer that includes one or more organic polymers, the organic polymers comprising at least 70% by weight of one or more alkenyl-aromatic polymers, the foamed polymer layer having opposing first and second major surfaces and a thickness orthogonal to the opposing major surfaces; a first facer sealingly bonded to the first major surface to form a first outer surface and a second facer sealingly bonded to the second major surface to form a second outer surface, wherein:

the foamed polymer layer has a foam density of at most 56 kg/m$^3$ (3.5 pounds per cubic foot), a thickness of at least 0.6 cm (0.25 inches), an RSI-value of at least 0.95 K·m$^2$/W per 25.4 mm of thickness (R-value of 5.11° F.·ft$^2$·h/BTU/inch of thickness), and contains at least 0.25 weight percent, based on the weight of the foamed polymer layer, of an infrared radiation attenuating additive;

the first facer has an opacity of at least 65%, an oxygen transfer rate (oxygen permeance) of at most 0.65 cc/m$^2$-day, an oxygen permeation rate of at most 0.9 cc-mil/m$^2$-day, and an Elmendorf tear strength of at least 120 g/25.4 μm in at least one direction;

the second facer has an oxygen transfer rate of at most 0.65 cc/m$^2$-day, an oxygen permeation rate of at most 0.9 cc-mil/m$^2$-day, and an Elmendorf tear strength of at least 120 g/25.4 μm in at least one direction, and the first outer surface exhibits a surface solar reflectance of at least 35% as measured according to ASTM C1549.

The invention is also related to an inverted roof membrane assembly comprising:

A. decking;
B. a water-proof membrane mounted directly or indirectly on top of the decking; and
C. at least one layer of the polymer foam insulation board of the invention directly or indirectly on top of layer B; and
D. a ballast layer directly or indirectly on top of layer C.

DETAILED DESCRIPTION OF THE INVENTION

Figure 1:
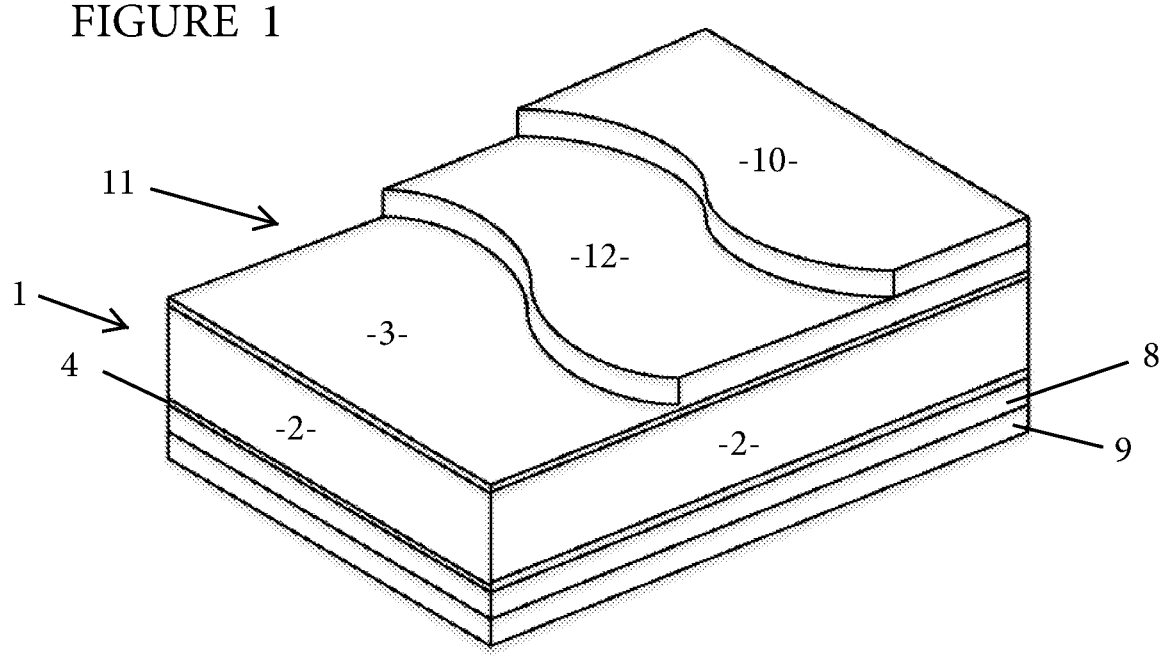
FIG. 1 is an isometric view, partially in section, of an embodiment of an inverted roof membrane assembly of the invention.
Figure 2:
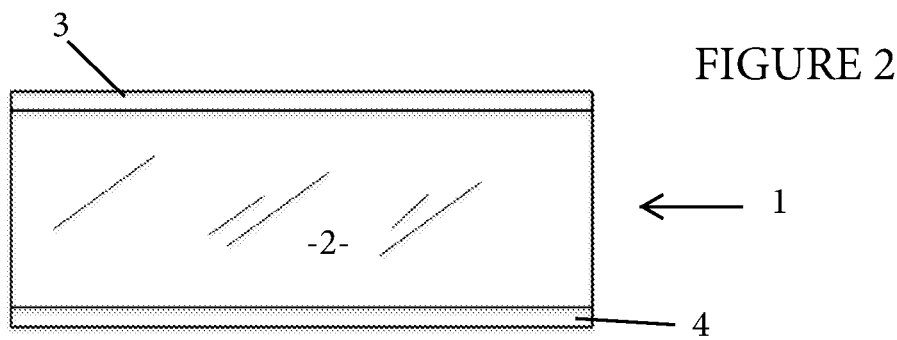
FIG. 2 is a side view, in section, of a polymer foam insulation board of the invention.

Turning to FIGS. 1 and 2, inverted roof membrane assembly 11 includes decking 9, water-proof membrane 8 mounted atop decking 9, polymer foam insulation board 1 mounted atop water-proof membrane 8, optional filter fabric 12 mounted atop polymer foam insulation board 1 and ballast 10 mounted atop filter fabric 12. Polymer foam insulation board 1 includes foamed polymer layer 2, first facer 3 and second facer 4. First facer 3 produces first outer surface 18 of polymer foam insulation board 1 and second facer 4 produces second outer surface 19 of polymer foam insulation board 1. For ease of illustration, the dimensions of the various materials shown in FIG. 1 are not to scale. In particular, the thicknesses of first facer 3 and second facer 4 are exaggerated.

When used in a roofing or other generally horizontal installation, first facer 3 and second facer 4 are conveniently regarded as "top" and "bottom" facers, respectively. Similarly, the first outer surface 18 and the second outer surface 19 of polymer foam insulation board 1 are in such instances conveniently regarded as "top" and "bottom" surfaces, respectively. "Top" and "bottom", when used with regard to the facers or outer surfaces, refer to orientation of polymer foam insulation board 1 when installed, such as in an inverted roof membrane assembly installation. The first or "top" facer is that which faces outward when installed, i.e., away from the structure to which it is applied and generally toward the exterior of the construction; in an inverted roof structure the first or "top" facer forms an outermost surface of the polymer foam insulation board. When installed in a roof structure, the second or "bottom" facer 4 is on the side of polymer foam insulation board 1 that faces membrane 8 and decking 9, whereas first or "top" facer 3 is on the opposite side of polymer foam insulation board 1, facing toward the ballast and exposed roof surface and forming an outermost surface of the polymer foam insulation board.

Foamed polymer layer 2 comprises one or more organic polymers, including one or more alkenyl-aromatic polymers. By "alkenyl-aromatic polymer", it is meant a homopolymer of alkenyl-aromatic monomer, a copolymer of two or more alkenyl-aromatic monomers, or a polymer (such as a random, block and/or graft copolymer) of at least 50%, preferably at least 70% or at least 75%, by weight of one or more alkenyl-aromatic monomers and up to 50% by weight, preferably up to 30% or up to 25%, of one or more other monomers that is not an alkenyl-aromatic monomer.

Alkenyl-aromatic monomers include, for example, styrene, alpha-methyl styrene, ethyl styrene, vinyl toluene, chlorostyrene and bromostyrene.

Examples of other monomers include, for example, acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate and butadiene.

The alkenyl aromatic polymer is thermoplastic, and may be linear or branched. The alkenyl aromatic polymer may have a weight average molecular weight, as measured by gel permeation chromatography (GPC) against linear polystyrene standards, of at least 40,000 g/mol, at least 60,000 g/mol or at least 75,000 g/mol. It may have a weight average molecular weight of, for example, up to 500,000 g/mol, up to 300.00 g/mol, up to 250,000 g/mol or up to 150,000 g/mol, by GPC against linear polystyrene standards. The alkenyl aromatic polymer may have a polydispersity (weight average molecular weight+number average molecular weight) of 1 to 3 or greater, preferably 1 to 2.5.

In some embodiments, water is soluble in the alkenyl aromatic polymer, at 130° C. and 101 kPa pressure, to the extent of 0.09 to 2.2 moles of water per kg of alkenyl aromatic polymer (mol/kg), preferably 0.15 to 2.2 mole/kg.

Alkenyl aromatic polymers of particular interest are styrene homopolymer and random and/or block copolymers of styrene and acrylonitrile. An especially preferred alkenyl aromatic polymer is a random and/or block copolymer of that contains 0.1 to 30% by weight polymerized acrylonitrile, 70% to 99.9% by weight polymerized styrene, and 0 to 2% by weight of one or more other monomers (such as other alkenyl aromatic monomers). Such a styrene-acrylonitrile copolymer may contain, for example, at least 5% or at least 10% by weight polymerized acrylonitrile and may contain up to 25%, up to 22.5% or up to 20% by weight polymerized acrylonitrile. Such a styrene-acrylonitrile copolymer may exhibit a positive "skew", and/or a positive percent difference between the mean and median copolymerized acrylonitrile distribution, each as defined in U.S. Pat. No. 8,324,287 (incorporated by reference) and may alternatively or in addition have a mean copolymerized acrylonitrile content of 20 weight-% or less.

The alkenyl aromatic polymer(s) preferably contain no more than 20 weight-percent halogen, more preferably no more than 10 weight-percent halogen or no more than 5 weight percent halogen. They may contain any smaller amount of halogen and may be devoid of halogen.

More than one alkenyl aromatic polymer may be present. In addition, the organic polymers may include one or more other organic polymers, which are not alkenyl aromatic polymers. Such other organic polymers, if present at all, preferably constitute no greater than 15 percent of the total weight of all the organic polymers, and more preferably no more than 5 weight percent thereof. The other organic polymer may be more hydrophilic than the alkenyl aromatic polymer(s). For example, water may be soluble in the other organic polymer in an amount greater than 2.2 moles/kg at 130° C. and 101 kPa pressure. Examples of such other organic polymers include copolymers of ethylene with one or more of acrylic acid, methacrylic acid, a $C_{1-4}$ polycarboxylic acid and/or an acrylate monomer; polyvinyl acetate; and polyacrylonitrile.

The foamed polymer layer includes at least 0.25 weight percent, at least 0.5 weight percent or at least 1.0 weight percent, based on the weight of the foamed polymer layer, of one or more infrared attenuating additives, i.e., an additive that inhibits the transmission of infrared radiation through the polymer foam. The foamed polymer layer may contain, for example, up to 5 weight percent, up to 3 weight percent or up to 2 weight percent of the infrared attenuating additive(s). Among the useful infrared absorbing additives are various forms of carbon (including, for example, one or more of graphite; carbon black; soot; carbonized fibers, flakes or powders; carbon nanotubes and fullerenes, powdered amorphous carbon and the like), metal flakes, metal and semi-metal oxides such as titanium dioxide, silicon dioxide, manganese (IV) oxide, magnesium oxide, bismuth (III) oxide, cobalt oxide, zirconium (IV) oxide, molybdenum (II) oxide, calcium oxide and alumina boehmite. A preferred polymer layer includes 0.25 to 5, preferably 0.25 to 3, weight percent of one or more forms of carbon, especially graphite, carbon black or a mixture thereof.

The polymer foam layer includes gas-containing cells. The gas in the cells in some embodiments includes at least one fluorocarbon having 1 to 4 carbon atoms. The fluorocarbon in some embodiments does not contain chlorine. Examples of such fluorocarbons include methyl fluoride, perfluoromethane, ethyl fluoride, 1,1-difluoroethane (HFC-152a), 1,1,1-trifluoroethane (HFC-143a), 1,1,1,2-tetrafluoroethane (HFC-134a), pentafluoroethane, difluoromethane, perfluoroethane, 2,2-difluoropropane, 1,1,1-trifluoropropane, perfluoropropane, perfluorobutane, perfluorocyclobutane, trifluoropropene, 1,3,3,3-tetrafluoropropene (1234ze), 1,1,3,3-tetrafluoropropene, 2,2,3,3-tetrafluoropropene (1234yf), 1,2,3,3,3-pentafluoropropene (1225ye), 1,1,1-trifluoropropene, 1,1,1,3,3-pentafluoropropene (1225zc), 1,1,2,3,3-pentafluoropropene (1225yc), (Z)-1,1,1,2,3-pentafluoropropene (1225yez), 1-chloro-3,3,3-trifluoropropene (1233zd) and 1,1,1,4,4,4-hexafluorobut-2-ene (1336mzzm), as well as other hydrofluoroolefin (HFO) and/or hydrofluorochloroolefin (HFCO) blowing agents such as those described, for example, in US 2007/0100010.

The gas in the cells in some embodiments includes carbon dioxide; water; and/or one or more $C_{1-9}$ hydrocarbons. In a preferred embodiment, the gas in the cells includes at least one fluorocarbon, carbon dioxide, water, and optionally also at least one hydrocarbon.

The foam layer has a density of at most 56 kg/m³ (3.5 pounds per cubic foot (pcf)). The foam layer density may be at least 21 kg/m³ (1.3 pcf), at least 28 kg/m³ (1.75 pcf) or at least 32 kg/m³ (2 pcf); and may be in some embodiments up to 40 kg/m³ (2.5 pcf) or up to 56 kg/m³ (3.5 pcf).

The polymer foam layer may contain other materials that perform useful functions in the foam layer and/or in preparing the foam layer. Examples of such other materials include, for example, pigments (other than the infrared attenuating additive(s)), fillers, antioxidants, extrusion aids, cell nucleation agents (other than the infrared attenuating additives(s)), antistatic agents, flame and/or smoke retardants, acid scavengers, and the like.

The foam layer has a thickness of at least 0.6 cm (0.25 inches). The foam layer thickness may be any larger value, such as up to 45.7 cm (18 inches), up to 30.5 cm (12 inches), up to 20.3 cm (8 inches) or up to 15.24 cm (6 inches). An advantage of this invention is that relatively thin foam layers provide excellent thermal insulation due to the high RSI values of the foam. An especially preferred thickness is at least 7.62 cm (3 inches) or at least 10.16 cm (4 inches) and up to 20.3 cm (8 inches) or up to 15.24 cm (6 inches).

The foam layer has an RSI-value of at least 0.95 K·m²/W per 25.4 mm of thickness, as measured according to ASTM C518-17 at a 24° C. mean temperature. The RSI value of the foam layer may be at least 1.0, at least 1.05, at least 1.1, at least 1.25 or at least 1.4 K·m²/W per 25.4 mm of thickness. The RSI value in some embodiments is up to 2, up to 1.75, up to 1.6 or up to 1.5 K·m²/W per 25.4 mm of thickness.

The foam layer preferably is an extruded foam made by forming a pressurized mixture of heat-softened alkenyl aromatic polymer(s), one or more blowing agents, the infrared absorbing additive(s) and other optional ingredients (if any) and then exposing the pressurized mixture to a lower pressure and temperature such that the mixture expands and cools to form a cellular foam. Such extrusion processes are well known and described, for example, in U.S. Pat. Nos. 5,380,767, 8,324,287 and 9,051,438, among many other references. Extrusion processes are conveniently performed using a single- or twin-screw extruder to form the pressurized mixture, which exits the extruder through a die, typically a dog bone-shaped die, after which the mixture expands and cools. Accumulating extrusion processes such as described in US Published Patent Application No. 2008-0139682A are also useful.

The gas within the cells of the resulting polymer foam corresponds, at least initially, to the blowing agent used to make the foam. Thus, the blowing agent may include, for example one or more of a fluorocarbon having 1 to 4 carbon atoms as described above; carbon dioxide; water; and a $C_{1-9}$ hydrocarbon. In some embodiments, the blowing agent is a mixture of that includes a fluorocarbon having 1 to 4 carbon atoms; carbon dioxide and water; in such a mixture, the fluorocarbon can be provided, for example, in an amount of 0.4-2, especially 0.5 to 1.2, mol/kg of alkenyl aromatic polymer(s) (mol/kg); carbon dioxide can be provided, for example, in an amount of 0.1 to 0.5, especially 0.2 to 0.4 mol/kg; and water can be provided, for example, in an amount of 0.15 to 2, especially 0.25 to 1.5 mol/kg, with the total amount of blowing agent being 0.65 to 2.5 mol/kg. Such blowing agent mixtures are described, for example, in US 2008/140892.

First facer 3 is sealingly bonded to one major surface of polymer foam layer 4, and second facer 4 is sealingly bonded to the opposing major surface of the polymer foam layer 2. By "sealingly bonded" it is meant that the facer is bonded to the polymer foam layer in such a way as to form a mechanical barrier to the bulk transfer of gasses into and out of the major surface of the polymer foam layer to which the facer is applied. Therefore, gas transfer through that major surface, if any, must take place by permeation of the gas or gasses through the facer. The facer therefore preferably is continuous, free of pores and other openings, and covers substantially the entire major surface to which it is applied. The bond strength between the each facer and the polymer foam layer should be at least 150 grams force/25.4 cm, as measured using an Instron Universal Testing Machine operated at a crosshead speed of 250 mm/minute and tested at 23° C. and 50% relative humidity (RH). The facers may be bonded directly to the polymer foam layer. Alternatively, a facer may be bonded to the polymer foam layer through an adhesive layer.

Each facer takes the form of one or more film layers. When the facer is constituted by two or more film layers, those layers may be applied to the polymer foam layer individually. Some or all of the individual layers may be first assembled into a multilayer structure that is subsequently applied onto the polymer foam. The facer preferably is thermoplastic.

The first facer has an opacity of at least 65% as measured by ASTM D1003-13. The opacity may be at least 70% or at least 75% and up to 100%. Upon lamination, the first facer surface of the polymer foam insulation board also preferably exhibits a surface solar reflectance of at least 35%, at least 40% or at least 50%, as measured according to ASTM C1549. The surface solar reflectance may be any higher value up to 100%. The second facer may or may not exhibit either or both of these properties. In some embodiments, the second facer meets both the opacity and solar reflectance requirements of the first facer, and may even be the same material as the first facer. Such embodiments have an advantage from the installation standpoint, as either major surface of the polymer foam insulation board may be installed facing upwardly (or outwardly). When the second facer layer lacks these opacity and reflectivity features, the polymer foam insulation board should be installed with the first facer layer facing upward or outward.

Both facers exhibit oxygen barrier properties. The facers exhibit an oxygen transfer rate (oxygen permeance) of at most 0.65 cc/m²-day, an oxygen permeation rate of at most 0.9 cc-mil/m²-day as measured according to ASTM D3985-17 at 23° C.

Each facer should exhibit an Elmendorf tear strength of at least 120 g/mil of thickness (120 g/25.4 μm thickness) in at least one direction, as measured according to ASTM D1922-15 at 23° C. and 50% RH.

Figure 3:
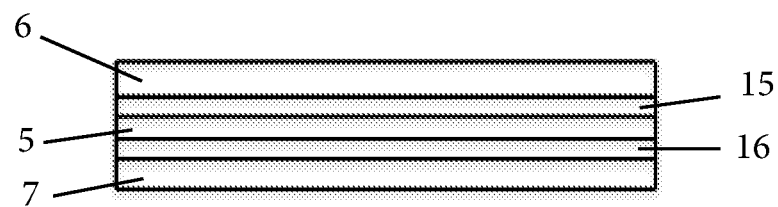
FIG. 3 is a side view, in section, of an embodiment of a facer layer for use in the invention.

Each facer preferably includes at least one oxygen barrier polymer layer (reference numeral 5 in FIG. 3). An oxygen barrier polymer layer 5 by itself may exhibit an oxygen permeation rate of at most 0.9, at most 0.5 or at most 0.3 cc-mil/m²-day as measured according to ASTM D3985-17. The oxygen barrier polymer layer may have a thickness of, for example, 1.27 to 50.8 μm (0.05 to 2 mils), preferably 2.54 to 50.8 μm (0.1 to 2 mils) or 5.08 to 38.1 μm (0.2 to 1.5 mils). Such thickness is generally sufficient to reduce the replacement of the blowing agent in the cells of the polymer foam layer with oxygen or air, thereby preserving the thermal conductivity of the polymer foam layer at low values for prolonged periods of time.

Examples of useful oxygen barrier polymers include ethylene-vinyl alcohol copolymers, vinylidene chloride polymers and copolymers, and polyamides. Ethylene-vinyl alcohol polymers are particularly suitable. An ethylene-vinyl alcohol polymer may contain, for example 10 to 50 mol-%, especially 15 to 35 mol-% ethylene units and correspondingly 50 to 90 mol-%, especially 65 to 85 mole-%, vinyl alcohol units, the ethylene and vinyl alcohol units preferably being randomly distributed. The ethylene-vinyl alcohol polymer may be prepared by polymerizing a monomer mixture of ethylene and vinyl acetate, followed by hydrolyzing the acetate groups to produce vinyl alcohol repeating units.

Each facer preferably includes at least one moisture barrier layer (as indicated by reference numerals 6, 7 in FIG. 3). One or more moisture barrier layers may be present directly or indirectly on either side of oxygen barrier polymer layer 5. Each moisture barrier layer suitably exhibits a permeance to water of not greater than 47 $g/m^2$-day (3.0 $g/100\ in^2$-day) at 38° C. (ASTM E96/E96M-16). A moisture barrier layer may have a thickness, for example, of 1.27 to 50.8 µm (0.05 to 2 mils), especially 2.54 to 25.4 8 µm (0.1 to 1 mil) or 2.54 to 12.7 µm (0.1 to 0.5 mil).

In some embodiments, the moisture barrier layer includes a thermoplastic polymer that provides moisture barrier properties. Suitable thermoplastic polymers include, for example, polyethylene (including any one or more of low density polyethylene, linear low density polyethylene, high density polyethylene, metallocene polyethylene), polypropylene homopolymers, copolymers of propylene and ethylene, ethylene-vinyl acetate polymers and the like. Blends of two of more such polymers may be used.

Moisture barrier layer 6, 7 each independently may include, in addition to the thermoplastic polymer, various ingredients such as antioxidants, film processing aids (such as slip agents and the like), pigments, dyes and/or other colorants and the like. A moisture barrier layer in first facer 3 (particularly moisture barrier layer 6 in FIG. 3) preferably includes at least one reflective filler. The reflective filler is a material that by itself reflects at least 80% of incident visible light (i.e., incident light with wavelengths of 400 to 700 nm). The reflective filler preferably also absorbs, scatters or reflects ultraviolet light, particularly both UVA and UVB radiation. Titanium dioxide and calcium carbonate are particularly suitable reflective fillers.

A moisture barrier layer may also include one or more ultraviolet light absorbers that are not reflective fillers. Such ultraviolet light absorbers may include, for example, benzophenone as well as various aryl esters, benzotriazoles and formamidines.

A first facer or second facer may also include one or more tie layers (reference numerals 15, 16 in FIG. 3) that promote adhesion between the various layers, particularly between a moisture barrier layer and an oxygen barrier polymer layer. A tie layer may be, for example, a polyolefin, particularly a polyethylene, modified with functional groups such as carboxylic acid or carboxylic acid anhydride. A tie layer may have a thickness, for example, of 1.27 to 25.4 µm (0.05 to 1 mil), especially 2.54 to 12.7 µm (0.1 to 0.5 mil).

In a particular embodiment, a first facer may include an interior (i.e., facing the polymer foam layer) moisture barrier layer 7 (FIG. 3) (which may itself be a multi-layer structure), comprising an ethylene-vinyl acetate polymer; an oxygen barrier polymer 5 layer comprising an ethylene-vinyl alcohol copolymer; and an exterior (i.e., facing away from the polymer foam layer) moisture barrier layer 6 comprising polyethylene (including any one or more of low density polyethylene, linear low density polyethylene, high density polyethylene, metallocene polyethylene). Exterior moisture barrier layer 6 preferably includes at least one reflective filler, at least one ultraviolet light absorber, or both a reflective filler and an ultraviolet light absorber.

In another particular embodiment, a second facer may include an interior (i.e., facing the polymer foam layer) moisture barrier layer 7 (which may itself be a multi-layer structure) comprising an ethylene-vinyl acetate polymer; an oxygen barrier polymer layer 5 comprising an ethylene-vinyl alcohol copolymer; and an exterior (i.e. facing away from the polymer foam layer) moisture barrier layer 6 comprising polyethylene (including any one or more of low density polyethylene, linear low density polyethylene, high density polyethylene, metallocene polyethylene). Exterior moisture barrier layer 6 of such a second facer may or may not include at least one reflective filler, at least one ultraviolet light absorber, or both a reflective filler and an ultraviolet light absorber; however, as mentioned before, it is often convenient to use the same material as both the first and second facer, in which case exterior moisture barrier 6 may include the reflective filler, ultraviolet light absorber or both.

The total thickness of a first or second facer may be, for example, 1.27 to 127 µm (0.5 to 5 mils), especially 19.05 to 63.5 µm (0.75 to 2 mils), or 25.4 to 50.8 µm (1 to 2 mils).

The polymer foam insulation board of the invention is conveniently provided in the form of rectangular or square boardstock having lengths (longest dimension) of 0.61 meters (24 inches) to 3.66 meters (12 feet), especially 1.83 to 3.66 meters (6 to 12 feet) and widths (orthogonal to the length along a major surface) of 0.305 meters (12 inches) to 3.66 meters (12 feet), especially 0.46 meters (18 inches) to 2.44 meters (8 feet) or 0.61 meters (2 feet) to 1.83 meters (6 feet).

The polymer foam insulation board may be rabbeted along one or more edges (preferably all four edges) to facilitate mating with adjacent sections of polymer foam insulation board during installation.

Decking 9 is a load-bearing layer that supports the overlying structures. It can be of concrete, reinforced concrete, metal, wood, a composite, organic polymer or other building material that is capable of bearing the superimposed weight.

Waterproofing membrane 8 is generally a thermoplastic or thermoset rubber such as thermoplastic olefin, ethylene-propylene-diene terpolymer or polyvinylchloride. Bitumen rubber membranes such as modified bitumen styrene-butadiene-styrene rubber membranes are useful as well. A bitumen rubber membrane may be reinforced with glass and/or polymeric fibers. Waterproofing membrane 8 may have a thickness of, for example 254 µm to 2.54 mm (10 to 1000 mil), especially 635 to 6350 µm (25 to 250 mil) or 635 to 3810 µm (25 to 150 mil). Waterproofing membrane 8 may comprise multiple layers.

In an IRMA, waterproofing membrane 8 may be installed directly above decking 9 as shown in FIG. 1. Alternatively, one or more optional layers may be installed between decking 9 and waterproofing membrane 8. Examples of such optional layers may include, for example, a drainage or rafting sheet good layer. Such a layer may include, for example, a semi-porous fabric whose function is to facilitate flow of water into one or more drainage structures through which water can be removed from the roof structure. Such a semi-porous fabric may be, for example a geotextile such as, an American Association of State Highway and Transportation Officials Class 1 or Class 2 geotextile. An example of a suitable geotextile is a polypropylene fabric weighing from 50 to 500 g/m$^2$ such as is available commercially as Optigreen® Separation Fabric. Another suitable layer is a dimpled sheet or fabric, in which water is collected in the dimples. Such a dimpled sheet is sometimes referred to as an "egg carton" structure, and may be engineered with openings through which excess water can flow to lower layers or out through a drainage system when the dimples have been filled.

Similarly, one or more optional layers as just described may be installed in an IRMA between waterproofing membrane 8 and layer(s) of the polymer foam insulation board 3, if desired.

When assembling an IRMA, the polymer foam insulation board 3 layer can be installed in the same manner as conventional foam insulation board, by laying individual sections of boardstock adjacent to each other to cover waterproofing membrane 8 and form an insulation and protective structure above waterproofing membrane 8. When rabbeted, individual sections of boardstock can be mated to form rabbet joints between adjacent sections of boardstock. Adjacent sections of boardstock can be shiplapped or even interlocking through corresponding mating rabbets on each of the adjacent boardstock sections. When shiplapped, channels form between the first outer surfaces of adjacent sections of boardstock; these can function to channel water toward a drain or an edge of the roof.

The polymer foam insulation board layer may or may not be secured to underlying roof structure. Optionally it may be secured through use of an adhesive or by any suitable mechanical fastening method. Alternatively or in addition, the polymer foam insulation board layer is at least partially loose-laid and at least partially held in place by and covered with a ballast material, i.e., a dense, heavy material that by force of gravity holds the polymer foam insulation board layer in place. Ballast materials may include a coarse or fine particulate material such as gravel, stone or soil. The ballast may be or include a planting medium for a green roof or other green roof structure or component of a green roof structure. The ballast may be or include a blue roof structure or a component thereof. Other ballast materials include pavers of various shapes and sizes, which may form a continuous or discontinuous layer. Different ballast materials may be used in any particular roof structure of the invention.

Other optional components of the inverted roof membrane assembly may include for example, one or more layers of a hydrophilic foam; one or more filter fabrics, drainage or rafting sheet good layers; one or more vegetation growth medium layers if not part or all of the ballast; one or more vegetation layers; one or more root barriers; one or more separation fabrics for preventing vegetation growth medium from washing down to lower layers while letting water pass; various elements of a water drainage system such as one or more drains, pipes, troughs or other fluid conduits, as well as associated flow management devices such as plugs, valves, pumps, flow control systems and the like; one or more ponding mechanisms (if not part of all of the ballast) for capturing and detaining water, any or all of which may be present directly or indirectly above the polymer foam insulation board layer 3. The inverted roof membrane assembly may be a "green roof", which has a vegetation layer, a "blue roof", which provides initial temporary water (typically rainfall or other precipitation) detention (other than via vegetation layer) and then gradual release of stored water, and/or a "blue-green" or "green-blue" roof, which combines features of both a green and a blue roof.

Although the polymer foam insulation board of the invention is particularly adapted for roofing applications, especially in IRMAs, it is also useful in other thermal insulation and/or protective applications, in essentially the same manner as conventional insulation board. Examples of such other uses include, for example, insulated concrete forms; insulation for flooring, including insulation for heated floors; insulating concrete tilt-up walls; insulating below-grade masonry structures such as basement walls and/or floors; structural insulated panels; insulation for conventional (i.e., non-inverted) low slope roofs; as thermal insulation for spas and/or hot tubs, including spa hot tub covers; insulation for refrigerated vehicles such as trucks and railcars; insulation for use in geothermal applications; HVAC insulation; built-in or stand-alone refrigerator and/or freezer insulation; insulation for pavement such as walkways, roadways, runways and parking areas; permafrost protection; insulating transmission tower bases; and the like.

In such of those other applications in which the polymer foam insulation board is exposed to incident radiation (especially radiation in the visible, UV and/or infrared spectra), the polymer foam insulation board preferably is installed with the first outer (or "top") surface facing the incident radiation, and the second outer (or "bottom") surface facing toward the structure to which the polymer foam insulation board is applied. In applications in which the polymer foam insulation board is not expected to be exposed to incident radiation, either the first or second outer surface can be oriented away from the underlying structure to which the polymer foam insulation board is attached.

As before, in these applications the polymer foam insulation board layer can be installed in the same manner as conventional foam insulation board, by laying individual sections of boardstock adjacent to each other to form an insulating and protective layer on the underlying structure. When rabbeted, individual sections of boardstock can be mated to form rabbet joints and/or other interlocking joints between adjacent sections of boardstock. Again, as before, shiplapped channels between the first outer surfaces of adjacent sections of boardstock can function to channel water toward a drain or an edge of the boardstock layer.

EXAMPLES

The first and second facers, among other advantages, provide the polymer foam insulation board of the invention with excellent resistance to moisture. To evaluate this, an extruded polymer foam is prepared in the general manner described in column 10 of U.S. Pat. No. 8,324,287, with the addition of 4.0 parts by weight per 100 parts by weight polymer of carbon black, and then immediately laminated to first and second facers as described below. The polymer is a styrene-acrylonitrile resin containing 15-20% by weight polymerized acrylonitrile having a weight average molecular weight of 125,000 to 150,000 g/mol and a polydispersity of 2.25 to 2.4, and also having a positive "skew" of about 0.9. Boardstock 1.7 cm thick, 35 cm wide and having a density of 33.3 kg/m$^3$ is prepared for purposes of moisture resistance evaluation, although thicker foams would generally be used in the inverted roof membrane assembly of the invention.

Multilayer facers are prepared by coextrusion. The first and second facers are identical for this experiment. Each facer includes the following layers, in order from interior (next to the foam layer) to exterior), the numeral designations referring to FIG. 3:

Layer 7: A blend of ethylene-vinyl acetate (25 wt.-% vinyl acetate) copolymer 74-76% by weight) and low density polyethylene (22% by weight), with minor amounts of film processing aids. Layer 7 is 11.81 µm (0.465 mils) thick.

Layers 15 and 16. Tie layers, being blends of a linear low polyethylene (85 wt.-%) with an anhydride-modified polyethylene (15 wt.-%). Thicknesses are 6.86 µm (0.27 mil) and 3.05 µm (0.12 mil), respectively.

Layer 5. Ethylene-vinyl alcohol copolymer (15-35 wt.-% vinyl alcohol units) interposed between the tie layers C and E. Thickness is 6.86 µm (0.27 mil).

Layer 6. Low density polyethylene with benzophenone, titanium dioxide and antioxidant, with minor amounts of film processing aids. Thickness is 9.53 µm (0.375 mil).

Each facer has an opacity of at least 65%, an oxygen transfer rate of at most 0.65 cc/m²-day, an oxygen permeation rate of at most 0.9 cc-mil/m²-day, and an Elmendorf tear strength in the machine direction of at least 120 g/mil. The facer width is 40 cm. Each facer exhibits a surface reflectivity of at least 35% upon lamination to the foam substrate.

The first and second facers are laminated to the major surfaces of the foamed polymer using dual heated roll laminator set to 190° C., positioned approximately 5 meters downstream of the foam extrusion die. The lamination pressure is 40 psi (276 kPa) and the line speed is about 7 meters/minute. The laminated product has an apparent density of 33.3 kg/m³.

This laminated foam is subsequently immersed in DI water for two months under a 2.5 cm water head at 21° C. After two months the laminated foam absorbs 0.01 vol % of water. Without the facer layers, the same polymer foam absorbs about 0.5 vol % water under similar test conditions.

Thermal conductivity of the laminated foam is measured prior to and after water immersion according to ASTM C518 using 10° C. and 24° C. average temperatures. At the 10° C. test temperature, the laminated foam exhibits an RSI value of 1.153 K·m²/W per 25.4 mm of thickness (R-value of 6.55° F.·ft²·h/BTU/inch of thickness), before immersion, and 1.051 K·m²/W per 25.4 mm of thickness (R value/inch of 5.97) after immersion, or a loss of less than 9%. At the 24° C. test temperature, the laminated foam exhibits an RSI value of 1.071 K·m²/W per 25.4 mm of thickness (R-value/inch of 6.08) before immersion, and an RSI value of 0.983 K·m²/W per 25.4 mm of thickness (R-value of 5.58/inch) after immersion, or a loss of slightly more than 8%.

A second extruded polymer foam is prepared in the general manner described in column 10 of U.S. Pat. No. 8,324,287, with the blowing agent package having a low global warming potential, and with the addition of 1.0 part by weight per 100 parts by weight polymer of graphite (Hubron International graphite grade PSB5), and then immediately laminated to first and second facers as described above. The foamed polymer is a styrene-acrylonitrile resin containing 15-20% by weight polymerized acrylonitrile having a weight average molecular weight of 125,000 to 150,000 g/mol and a polydispersity of 2.25 to 2.4, and also having a positive "skew" of about 0.9. The blowing agent package includes 4.25 pph HFC152a, 4.25 pph HFO1234ze, 0.9 pph $CO_2$, and 0.9 pph $H_2O$. The foam boardstock 1.5 cm thick, 33 cm wide and having a density of 22.4 kg/m³. Adhesion strength between the foam core and the facer is 1.47 N/25.4 mm (150 grams-force/inch). The RSI is 1.18 (R6.7/in) compared to baseline sample (no barrier facer) RSI at 0.97 (R5.5/in).

What is claimed is:

1. A polymer foam insulation board comprising a foamed polymer layer that includes one or more organic polymers, the organic polymers comprising at least 70% by weight of one or more alkenyl-aromatic polymers, the foamed polymer layer having opposing first and second major surfaces and a thickness orthogonal to the opposing major surfaces; a first facer sealingly bonded to the first major surface to form a first outer surface and a second facer sealingly bonded to the second major surface to form a second outer surface, wherein:

the foamed polymer layer has a foam density of at most 56 kg/m³ (3.5 pounds per cubic foot), a thickness of at least 0.6 cm (0.25 inches), an RSI-value of at least 0.95 K·m²/W per 25.4 mm of thickness (R-value of 5.11° F.·ft²·h/BTU/inch of thickness), and contains at least 0.25 weight percent, based on the weight of the foamed polymer layer, of an infrared radiation attenuating additive;

wherein the infrared radiation attenuating additive is one or more of graphite; carbon black; soot; a carbonized fiber, flake, or powder; carbon nanotubes, fullerenes, graphene, graphene oxide, or graphite nanoplatelets, wherein each of said first and second facers is constituted by layers comprising films assembled into a multilayer structure, each of said first and second facers having a thickness of 19.05 to 63.5 µm, the layers comprising, in order from the foamed polymer layer to an outermost surface of the polymer foam insulation board, an interior moisture barrier layer facing the foamed polymer layer, a tie-layer comprising polyolefin, an oxygen barrier polymer layer, a tie-layer comprising polyolefin, and an exterior moisture barrier layer, wherein the interior moisture barrier layer comprises ethylene-vinyl acetate polymer and the exterior moisture barrier layer comprises polyethylene;

wherein each interior moisture barrier layer has a thickness of 2.54 to 12.7 µm, wherein each exterior moisture barrier layer has a thickness of 2.54 to 12.7 µm and further comprises a reflective filler, wherein the reflective filler, by itself, reflects at least 80% of incident visible light, wherein each of the first and second facer has an opacity of at least 65%, an oxygen transfer rate of at most 0.65 cc/m²-day, an oxygen permeation rate of at most 0.9 cc-mil/m²-day, and an Elmendorf tear strength of at least 120 g/25.4 µm in at least one direction; and wherein each of the first outer surface and the second outer surface exhibits a surface solar reflectance of at least 35% as measured according to ASTM C1549.

2. The polymer foam insulation board of claim 1, wherein the foamed polymer layer has a foam density of 21 to 56 kg/m³ and a thickness of 7.62 to 15.24 cm.

3. The polymer foam insulation board of claim 1 wherein the alkenyl-aromatic polymer is a styrene-acrylonitrile copolymer that contains 10 to 22.5% by weight polymerized acrylonitrile and no more than 5 weight-percent halogen, based on the weight of the styrene-acrylonitrile copolymer.

4. The polymer foam insulation board of claim 1 wherein the foamed polymer layer contains 0.25 to 5 weight percent of the infrared radiation attenuating additive.

5. The polymer foam insulation board of claim 1 wherein the oxygen barrier layer comprises ethylene-vinyl alcohol copolymer.

6. The polymer foam insulation board of claim 1 wherein the reflective filler is titanium dioxide, calcium carbonate or both titanium dioxide and calcium carbonate.

7. The polymer foam insulation board of claim 1 wherein the first and second facers are the same.

8. The polymer foam insulation board of claim 1 which is rabbeted along one or more edges.

9. An inverted roof membrane assembly comprising:
   a. decking;
   b. a waterproofing membrane mounted directly or indirectly on top of the decking;
   c. at least one layer of the polymer foam insulation board of claim 1 directly or indirectly on top of layer B; and
   d. a ballast layer directly or indirectly on top of layer C.

10. The inverted roof membrane assembly of claim 9 wherein the ballast comprises gravel, stone, soil, one or more pavers, a green roof structure or component thereof, or a blue roof structure or component thereof.

11. The inverted roof membrane assembly of claim 9, wherein the foamed polymer layer of the polymer foam insulation board has a foam density of 21 to 56 kg/m$^3$ and a thickness of 7.62 to 15.24 cm.

12. The inverted roof membrane assembly of claim 9, wherein the alkenyl-aromatic polymer of the polymer foam insulation board is a styrene-acrylonitrile copolymer that contains 10 to 22.5% by weight polymerized acrylonitrile and no more than 5 weight-percent halogen, based on the weight of the styrene-acrylonitrile copolymer.

13. The inverted roof membrane assembly of claim 9, wherein the foamed polymer layer of the polymer foam insulation board contains 0.25 to 5 weight percent of the infrared radiation attenuating additive.

14. The inverted roof membrane assembly of claim 9, wherein the oxygen barrier layer comprises ethylene-vinyl alcohol copolymer.

\* \* \* \* \*